H. E. GIDDINGS.
TELESCOPE TURBINE WIND ENGINE.
APPLICATION FILED MAY 6, 1911.
1,002,833.
Patented Sept. 12, 1911.
3 SHEETS—SHEET 1.
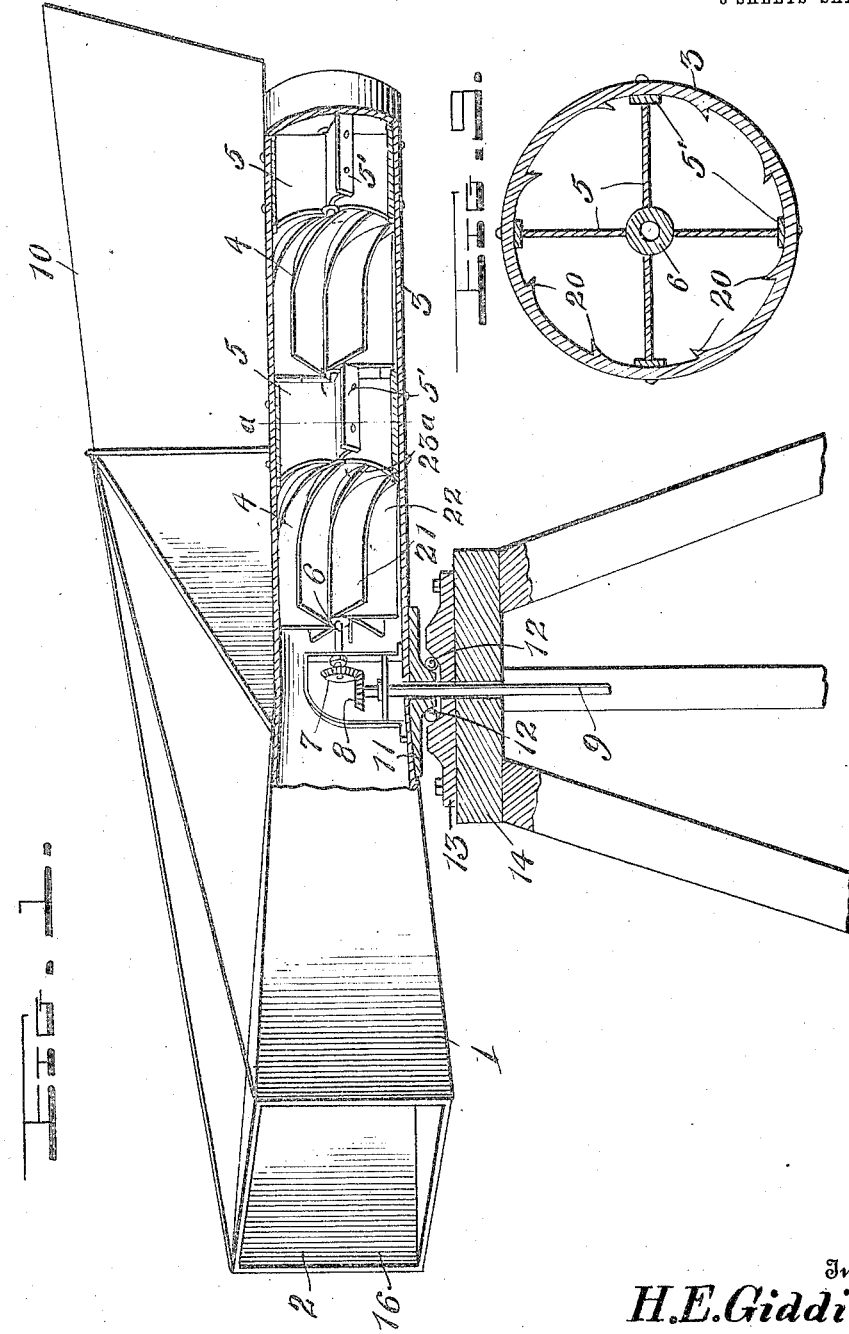
Witnesses
Chas. L. Griesbauer.
L. G. Ellis.
Inventor
H. E. Giddings,
By Watson E. Coleman,
Attorney

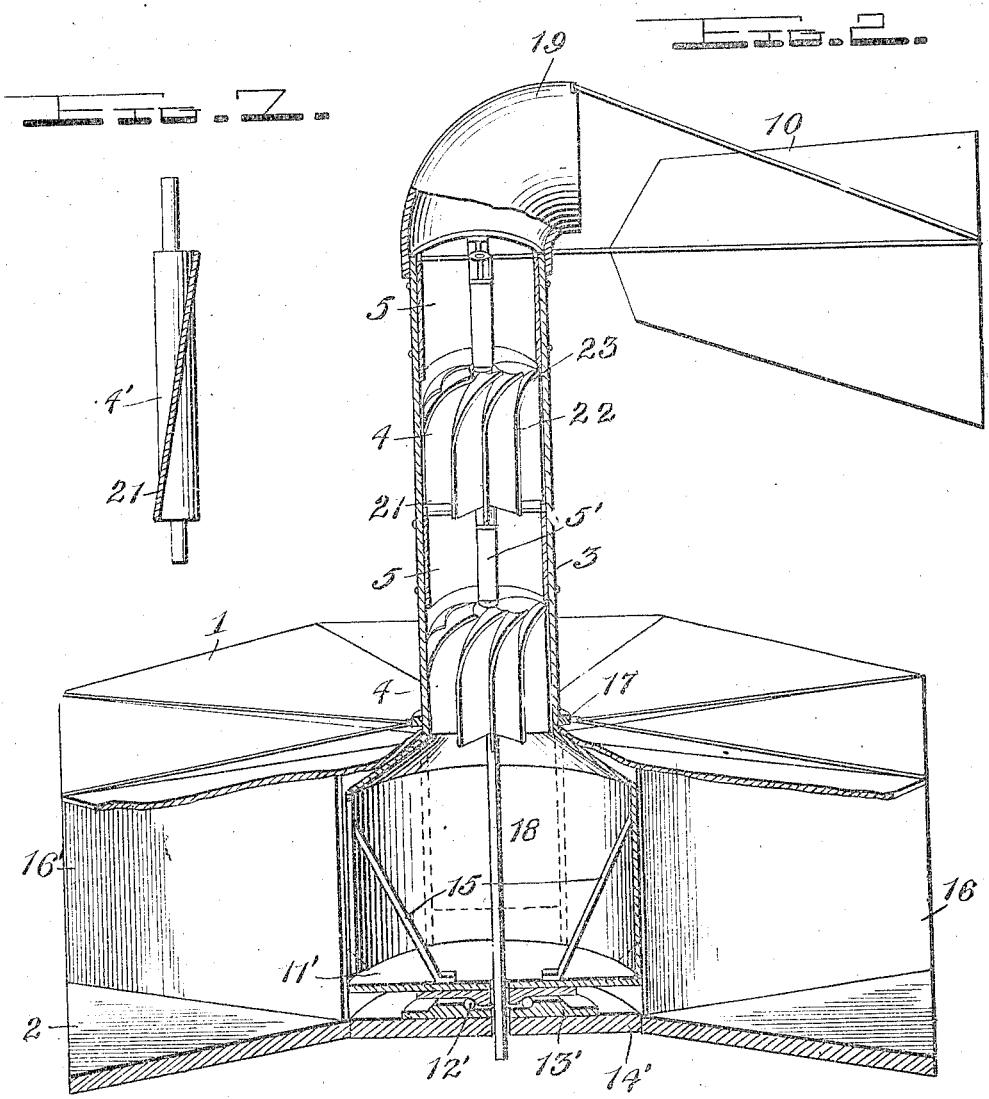

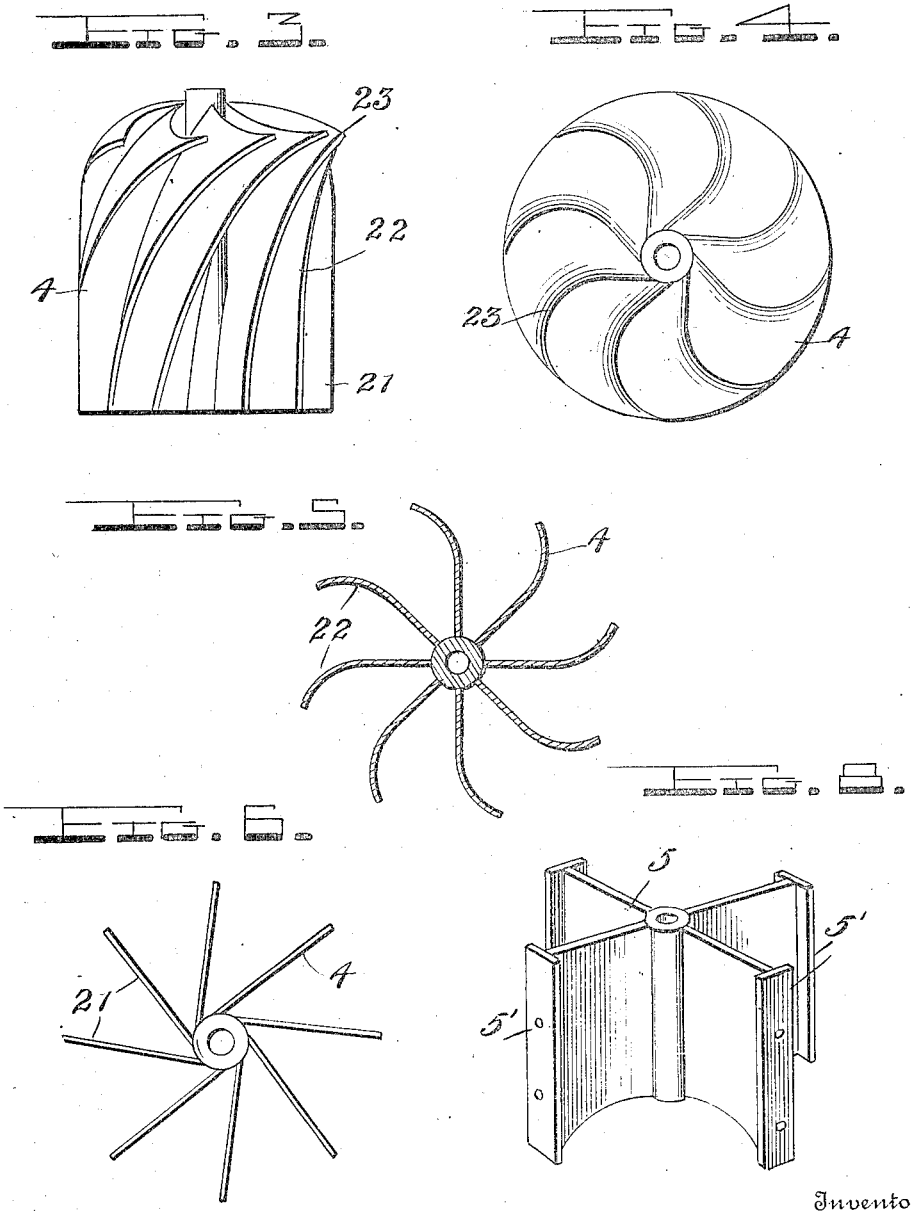

UNITED STATES PATENT OFFICE.

HOMER E. GIDDINGS, OF AMARILLO, TEXAS.

TELESCOPE-TURBINE WIND-ENGINE.

1,002,833.

Specification of Letters Patent. Patented Sept. 12, 1911.

Application filed May 6, 1911. Serial No. 625,434.

*To all whom it may concern:*

Be it known that I, HOMER E. GIDDINGS, a citizen of the United States, residing at Amarillo, in the county of Potter and State of Texas, have invented certain new and useful Improvements in Telescope-Turbine Wind-Engines, of which the following is a specification, reference being had to the accompanying drawings.

This invention relates to wind motors and more particularly to a turbine wheel wind engine in which the working parts are inclosed.

The objects of my invention are to provide a wind motor which is compact and efficient and in which the main working parts are inclosed and free from rain or snow.

A further object of my invention is to provide a new type of turbine blade for such engine which will be particularly suitable for this class of work.

A still further object is to provide means in such an engine whereby the rotary motion of the air after passing through a turbine wheel can be checked and entirely eliminated and thereby cause the air to flow in a direct line to the succeeding turbine wheels.

A still further object is to provide means whereby the whole body of the engine will be directed in a suitable direction to receive and utilize the wind efficiently.

These and many other objects will become apparent as my invention is more fully set forth.

In the accompanying drawings, which illustrate modifications of my invention, Figure 1 represents a perspective view partly in section of a wind turbine engine having a revolving body; Fig. 2 represents a view partly in section of a wind turbine engine which has a stationary body and revolving cylinder; Fig. 3 is a view in elevation of a turbine wheel; Fig. 4 is a top plan view of Fig. 3; Fig. 5 is a central cross sectional view of Fig. 3; Fig. 6 is a view showing a bottom plan view of Fig. 3; Fig. 7 shows the angular disposition to a blade on the axle of a turbine wheel; Fig. 8 is a perspective view of a baffle member or device for eliminating the rotary motion of the air in the cylinder; and Fig. 9 is a sectional elevation along the line *a—a* of Fig. 1.

In the appended drawings, which illustrate forms of my invention, 1 represents a main body of a turbine wind engine which is provided with a funnel shaped portion 2 to receive the air or a plurality of such openings as shown in Fig. 2 and has at its other end a cylinder 3 which contains therein turbine wheels 4 and baffle member 5 mounted on a shaft 6 which is suitably supported in the cylinder and is provided at a suitable portion thereof with double gears 7 and 8 which transmit the power derived from the wind to a shaft 9 and from thence to the place of use.

A shield or guide vane 10 is attached to the engine cylinder to revolve either the entire body of the engine, as in Fig. 1, or the cylinder and turret portion 3 and 18 of Fig. 2, in order to guide the opening 16 in Fig. 1 and the opening in the turret chamber 18 of Fig. 2 toward the wind current.

Referring particularly to Fig. 1 the whole body of the engine 1 is arranged with revolving means on the bottom portion thereof which consist preferably of plates 11 rotatable on bearing balls 12 which revolve on a supporting plate 13 mounted on a suitable stand 14.

In Fig. 2 the cylinder 3 has a suitable framework 15 extending from it and is provided with a blade 11' which revolves on balls 12' which rotate on a supporting plane 13' which is suitably mounted on a stand or framework 14'. The whole body 1 in Fig. 2 is stationary and secured in a suitable manner to a roof or other support and consists of a plurality of funnels having openings 16' which are disposed all around the turret 18 so as to receive the wind in every direction. Fastened to the lower portion of the cylinder 3 is a collar 17 which is arranged to readily slide on the outer surface at the lower end of the cylinder 3 to sustain said cylinder in an upright position. Below the cylinder is a chamber 18 in which the air accumulates before it is diverted into the cylinder 3. In this case the upper portion of the cylinder is preferably provided with a hood 19 which is movably operated by the wind vane 10. The baffle member 5 consists of rigid wheels having plain blades or spokes terminated with cross pieces 5', which are secured to the cylinder walls. The blades being rigid and in the path of the air avert its revolving motion and eliminate entirely the rotary action of the air as it passes through the turbine wheels 4, thereby imparting additional actuating power to the turbine wheel beyond. On the inside of the cylinder 3 at the portion of the cylinder in which the turbine wheels 4 rotate are a plurality of spur ribs extending longitudinally with the inner wall of the cylinder which serve to catch the air and resist its rotary tendency while passing through the turbine wheels.

Referring to Fig. 1 in particular, the operation is as follows: The wind blowing across the engine strikes the vane 10 and directs it to receive the wind current at the opening 16. The wind passing into the funnel mouths or openings 16 passes onward into the same through the first turbine wheel 4 which it actuates, thence into the baffle member space where the rotary action of the current is destroyed by the baffle member 5, thence continuing to another turbine wheel which is actuated and assists the previous turbine wheel, from thence the air comes to another baffle member and exhausts out of the cylinder 3. Should the wind change at all it will actuate the vane 10 and direct the funnel to receive it so that the engine is kept continually in motion. The turbine wheels in their action, operate the shaft 6, both gears 7 and 8, and the shaft 9.

In Fig. 2, the wind will blow into the funnel openings 16' which are directly in its way, thence it will blow into the chamber 18 and thence to the turbine blades, the baffle member, into the hood 19, and thence to the open. The vane 10 actuates the hood 19 so that its opening is always opposite the direction of the wind and the opening of the turret 18 is toward the wind.

The compact construction of the blades of the turbine wheels derives a great efficiency of power from the wind. The lower portion 21 of the blade 4 is preferably straight and curves slightly to the portion 22, as shown in Fig 5, from thence it curves on at a much greater rate, as shown in Figs. 3 and 4, so that the upper portion 23 merges into an arc in shape. The blades are disposed at a slight angular position on the axle 4', as shown in Fig. 7, in order to receive and utilize the air as it comes through the cylinder and to avoid any possibility of the wind passing entirely through the turbine wheel without affecting it.

The advantages of my apparatus are many but, in particular, consist in that the pressure of the wind is concentrated to a smaller surface and more readily actuates the turbine wheels of the engine which permits a cylinder of small cross section to be used and also utilizes the wind even when at very low speed or pressure. This type of construction forms a more compact engine than is possible in any other form of wind motor ever devised. Further, all the parts being inclosed in the cylinder and body of the engine they are fully protected from the harmful effects of the elements.

The diverting faces of the baffle member are particularly desirable because of the direct action they induce on the blades of the turbine wheel and also because they eliminate entirely the rotary action within the cylinder which would tend to spend itself on the sides thereof. In the style of vertical cylinder and surrounding body of funnels, a less bearing surface is required because of the lesser weight on the bearing portions. The benefits, of a hood on this type of engine, are that it opens in an opposite direction to the wind so that the wind in passing by the edges of its opening gives a pressure vacuum and assists in drawing the air out of the cylinder which increases the power developed by the turbine wheels.

While I have shown my engine with only two turbine wheels and two baffle members, I anticipate the use of these parts in greater or less numbers, to suit various conditions that may arise. I also anticipate the use of a plurality of openings of various shapes, and do not wish to limit myself in any way but that necessitated by the prior art as many modifications of my construction can be made without departing from the principles thereof.

Having thus described the invention, what is claimed is:

1. A wind motor comprising in combination a main body having a plurality of funnel opening therein for receiving air, a cylindrical member disposed within said body and arranged to rotate therein, means for supporting said cylindrical body, a plurality of turbine wheels disposed within said cylindrical body, an axle for supporting said wheels means for securing said wheels and said axle, a plurality of baffle members having their inner portions arranged to receive said axle and permit it to rotate freely therein.

2. A wind motor comprising in combination a main body having a plurality of funnel openings therein for receiving air, a cylindrical member disposed within said body and arranged to rotate therein, means for supporting said cylindrical body, a plurality of turbine wheels disposed within said cylindrical body, and an axle for supporting said wheels, means for securing said wheels to said axle, a plurality of baffle members having their inner portions arranged to receive said axle and permit it to rotate freely therein, said members being rigidly secured to the sides of said cylinder a hood disposed on the end of said cylinder and arranged so as to be disposed out of the direction of the wind.

3. A wind motor comprising in combination a main body having a plurality of funnels disposed polygonally around the central portion of said body, a cylindrical portion disposed within said body and arranged to rotate therein, and provided with a plate to guide the air from said funnels through said cylindrical portion a plurality of turbine wheels disposed within said cylindrical body, an axle for supporting said wheels, means for securing said wheels to said axle, a plurality of baffle members having their inner portions arranged to receive said axle and permit it to rotate freely therein, said members being rigidly secured to the sides of said cylinder, a hood disposed on the end of said cylinder and arranged so as to be disposed out of the direction of the wind.

4. A wind motor comprising in combination a main body having a plurality of funnels disposed polygonally around the central portion of said body, a cylindrical portion disposed within said body and arranged to rotate therein, said cylindrical portion being vertically disposed within said main body and having its upper portion extending beyond said body, and provided with a plate to guide the air from said funnels through said cylindrical portion, a plurality of turbine wheels disposed within said cylindrical body, an axle for supporting said wheels, means for securing said wheels to said axles, a plurality of baffle members having their inner portions arranged to receive said axle and permit it to rotate therein, a plurality of projections disposed on the sides on said cylinder around said baffle members, said projections having sharp edges and arranged so as to catch on the air as the same flows therethrough, said members being rigidly secured to the sides of said cylinder a hood disposed on the end of said cylinder and arranged to be disposed out of the direction of the wind.

5. A wind motor comprising in combination a main body having a plurality of funnels disposed polygonally around the central portion of said body, a cylindrical portion disposed within said body and arranged to rotate therein, said cylindrical portion being vertically disposed within said main body and having its upper portion extending beyond said body, and provided with a plate to guide the air from said funnels through said cylindrical body, a plurality of turbine wheels disposed within said cylindrical body, an axle for supporting said wheels, means for securing said wheels to said axles, a plurality of baffle members having their inner portions arranged to receive said axle and permit it to rotate therein, said baffle members and turbine wheels being arranged alternately in said cylindrical portion, a plurality of projections disposed on the sides of said cylinder around said baffle members, said projections having sharp edges and arranged so as to catch on the air as the same flows therethrough, said members being rigidly secured to the sides of said cylinder, a hood disposed on the end of said cylinder and arranged to be disposed out of the direction of the wind.

In testimony whereof I hereunto affix my signature in the presence of two witnesses.

HOMER E. GIDDINGS.

Witnesses:
B. H. McALPINE,
G. D. MURPHY.